United States Patent [19]
Walcott

[11] Patent Number: 5,939,017
[45] Date of Patent: Aug. 17, 1999

[54] CUTTING TORCH HEIGHT CONTROL SYSTEM

[75] Inventor: Wayne R. Walcott, Hartland, Wis.

[73] Assignee: MG Systems & Welding, Inc., Menomonee Falls, Wis.

[21] Appl. No.: 09/231,916

[22] Filed: Jan. 14, 1999

[51] Int. Cl.⁶ .................................................. B23K 7/10
[52] U.S. Cl. ............................................. 266/76; 266/78
[58] Field of Search ................................ 266/48, 76, 78; 148/194, 195

[56] References Cited

U.S. PATENT DOCUMENTS

| | | | |
|---|---|---|---|
| 2,411,737 | 11/1946 | Klinke | 266/76 |
| 3,432,366 | 3/1969 | Lotz | 266/76 |
| 3,809,308 | 5/1974 | Roeder et al. | 266/76 |
| 4,533,078 | 8/1985 | Klein et al. | 266/76 |
| 4,682,004 | 7/1987 | Schmall | 266/48 |

*Primary Examiner*—Scott Kastler
*Attorney, Agent, or Firm*—Andrus, Sceales, Starke & Sawall

[57] ABSTRACT

A program controlled metal cutting torch includes a torch height control system that utilizes a vibration sensor, such as an accelerometer, to provide a signal indicating torch tip contact with the metal workpiece to facilitate an initial height sensing routine or inadvertent torch contact with an obstruction as the torch moves horizontally during its programmed cutting process. In either instance, the vibration signal representative of torch contact is processed to stop the torch drive device and to raise the torch to the proper predetermined height.

5 Claims, 1 Drawing Sheet

CUTTING TORCH HEIGHT CONTROL SYSTEM

BACKGROUND OF THE INVENTION

The present invention pertains to a system for controlling the operation of a cutting torch or torches of the type operable for programmed cutting of shapes from a sheet metal workpiece and, more particularly, to a height control system for such a torch.

Metal cutting torches, such as oxy-fuel or plasma torches, are operated in response to programmed control to cut a wide variety of shapes from a metal workpiece, typically a plate supported horizontally below one or more cutting torches. The cutting torch is typically mounted on a carriage for two-axis movement over the workpiece and additionally includes a vertical torch transport mechanism operable to move the cutting torch vertically and perpendicular to the planes of two-axis horizontal movement. For optimal cutting operation, the torch must be positioned at a predetermined height above the workpiece.

There are presently several methods and associated apparatus used to set the initial height of a cutting torch above the workpiece. This is commonly known as initial height sensing for establishing the torch pierce distance. In one such prior art system, the increased load on the motor used to drive the vertical torch transport mechanism is detected as the torch tip is driven downwardly into contact with the plate or other workpiece. A control system responsive to the increase in drive motor current (or some other indicia of a stalled motor such as the absence of encoder velocity pulses) stops the motor and reverses it to raise the torch to the predetermined initial operative height. Another system utilizes a circuit ground signal as the tip of the torch contacts the plate to again stop and reverse the vertical torch transport mechanism. Such a system is relatively simple but requires the use of an electrically conductive torch tip and circuitry designed to tolerate high electrical noise. Non-contact systems are also utilized which typically use a sensor mounted laterally outboard of the torch to detect the surface of the plate or other workpiece at a known fixed distance. Such sensors include capacitive, inductive and optical, but with each of these types of sensor, the point on the plate directly under the torch tip is not detected and, as a result, an error in initial height may result.

During horizontal cutting operation of a torch, the torch tip may engage a vertically displaced cut piece or other obstruction in its cutting path. The torch height control system should also be responsive to such accidental or inadvertent contact to halt horizontal torch movement and, if necessary, raise the torch vertically to clear the obstruction.

SUMMARY OF THE INVENTION

In accordance with the present invention, a torch positioning system is provided which is operable both to provide initial cutting height positioning and torch retraction as a result of collision. A vibration sensor is utilized to generate a torch tip contact signal, the signal is electronically conditioned, and utilized to operate a conventional vertical torch transport mechanism.

The height control apparatus of the present invention comprises a mounting device which carries the torch horizontally over the workpiece. The mounting device includes a vertical torch transport mechanism which is operable to move the torch between a lower position with the torch tip in contact with the workpiece and a non-contact upper position with the torch tip positioned at a predetermined height above the workpiece. A vibration sensor is operatively connected to the cutting torch to generate a vibration signal as a result or torch tip contact with the workpiece. Circuit means are provided with are responsive to the vibration signal to operate the transport mechanism to stop torch movement and move the torch to a non-contact position.

The torch mounting device preferably includes a carriage which is operable to provide horizontal movement of the torch over the workpiece. The vertical torch transport mechanism includes a drive motor and a motor control which is responsive to torch tip contact resulting from downward movement to reverse the motor and to raise the torch to the predetermined non-contact position. The motor control is also responsive to torch tip contact resulting from horizontal movement of the cutting torch to reverse the motor and raise the torch to a non-contact position.

In a preferred embodiment, the vibration sensor comprises an accelerometer and the circuit means includes means for conditioning the vibration signal, means for establishing an operative threshold level for the signal, and means for applying the signal to the vertical torch transport mechanism.

BRIEF DESCRIPTION OF THE DRAWING

The single drawing FIGURE shows a generalized arrangement of a cutting torch positioning apparatus, including an electrical schematic of the height control apparatus of the present invention.

DETAILED DESCRIPTION OF THE PREFERRED EMBODIMENT

Figure 1:
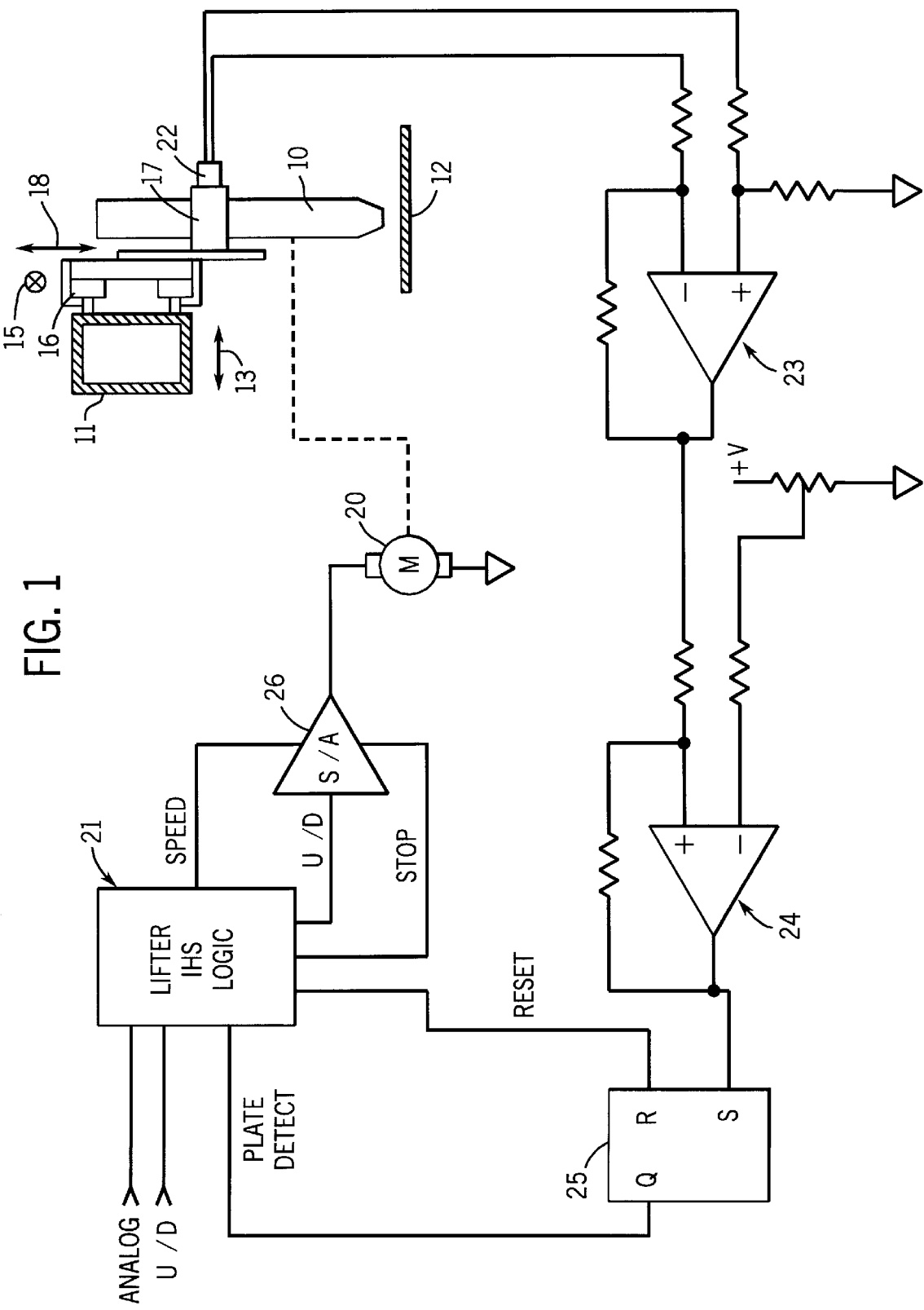

The main elements of a cutting torch mounting and carriage system are shown in a generalized arrangement in the drawing. A cutting torch 10 is mounted for reciprocal movement along each of three mutually perpendicular axes. A main cross beam 11 typically spans a cutting table (not shown) which supports a metal plate 12 or other workpiece and over which the cutting torch 10 is moved horizontally to effect a programmed cutting of shapes from the metal plate 12. The main cross beam 11 may be supported by wheeled carriages on opposite ends which are driven on spaced parallel tracks on a first horizontal or X-axis 13. A torch carriage 14 is mounted to traverse the cross beam 11 on a second horizontal or Y-axis 15 (perpendicular to the plane of the drawing FIGURE). The torch carriage 14 may operate along the Y-axis 15 on tracks 16 in a manner well known in the art. A cutting torch holder 17 is mounted for reciprocal vertical movement on and with respect to the carriage 14 along a third or Z-axis 18. The vertical movement of the torch holder 17 may be provided by any type of well known translating mechanism, such as a rack and pinion, lead screw, or the like. Accurate vertical positioning of the cutting torch along the Z-axis 18 is provided by a servomotor 20 utilizing the height control system of the present invention.

The height control apparatus utilizes a conventional torch lifter logic circuit 21 which controls the servomotor 10 to provide the speed, direction and distance of the cutting torch 10 on the torch holder 17. Systems of the prior art utilize similar lifter logic, but as indicated above, are responsive to other means for detecting the metal plate 12, such as high servomotor current, conductive contact of the torch tip with the plate, means for detecting the distance from the torch tip to the surface, and the like. The present invention utilizes a vibration sensor, preferably an accelerometer 22, to provide the signal identifying contact between the tip of the cutting torch 10 and the metal plate 12. A signal from the accelerometer 22 may also be utilized and processed in the manner to be described to detect contact between the torch tip and an obstruction in the torch path as it moves horizontally on the X-axis 13, or the Y-axis 15, or a path combining components of both movements.

The accelerometer 22 is mounted on or in close proximity to the cutting torch 10, preferably either on the torch body itself, or the torch holder 17. As the torch holder and attached cutting torch move vertically downwardly on the Z-axis by operation of the servomotor 20, contact between the torch tip and the metal plate 12 causes vibrations which are sensed by the accelerometer causing it to generate an electronic signal representative of the contact vibration. A typical accelerometer suitable for use in the system of the present invention is a piezoelectric device. However, any device capable of generating a voltage, current, frequency or similar electronic signal from a mechanical vibration may be utilized. The contact vibration signal from the accelerometer 22 is passed to a signal conditioning device 23, such as an op-amp. The signal conditioning device filters and otherwise conditions the vibration signal and outputs a conditioned signal suitable for the high electric noise environment of torch cutting systems. In lieu an op-amp, an A/D converter or a digital signal processor may also be used. The conditioned signal is fed to a threshold detector 24, such as the op-amp shown that will pass a control signal at or above a predetermined vibration level resulting from torch tip contact with the metal plate. The threshold signal activates a latching device 25, such as a conventional flip-flop to direct the torch tip contact signal to the lifter logic circuit 21 where it is processed to activate the servomotor 20 via a suitable amplifier 26.

The programmed lifter logic circuit acts initially to stop the servomotor and then reverse the same to raise the torch holder 14 and attached torch 10. In the case of initial height sensing, the servomotor is reversed to raise the torch to a predetermined pierce height by using a timed raise, encoding pulse counting, or incrementing an open loop stepper motor. In the case of torch collision with an obstacle in the path of horizontal torch movement on either the X or Y axis, the torch may be raised to any predetermined height adequate to clear the obstruction.

I claim:

1. A height control apparatus for positioning the tip of a cutting torch with respect to a workpiece, said apparatus comprising:

a mounting device for carrying the cutting torch over the workpiece; said mounting device including a vertical torch transport mechanism operable to move the torch between a lower position with the torch tip in contact with the workpiece and a non-contact upper position with the torch tip positioned at a predetermined height above the workpiece;

a vibration sensor operatively connected to the cutting torch to generate a vibration signal as a result of torch tip contact with the workpiece; and circuit means responsive to the vibration signal for operating the transport mechanism to move the torch to a non-contact position.

2. The apparatus as set forth in claim 1 wherein said torch mounting device includes a carriage operable horizontally over the workpiece.

3. The apparatus as set forth in claim 1 wherein the vertical torch transport mechanism includes a drive motor and a motor control responsive to torch tip contact resulting from vertical downward movement to reverse the motor and to raise the torch to said predetermined non-contact position.

4. The apparatus as set forth in claim 1 wherein said motor control is responsive to torch tip contact resulting from horizontal movement of the cutting torch to reverse the motor and to raise said torch to a non-contact position.

5. The apparatus as set forth in claim 1 wherein said vibration sensor comprises an accelerometer and said circuit means includes means for conditioning said signal, means for establishing an operative threshold level for the signal, and means for applying the signal to the vertical torch transport mechanism.

* * * * *